US012674783B2

(12) United States Patent　　　(10) Patent No.: US 12,674,783 B2
Silveira et al.　　　　　　　　　　(45) Date of Patent: Jul. 7, 2026

(54) SYSTEMS AND METHODS FOR ELECTROSPRAY USING CHROMATOGRAPHIC COLUMNS WITH CONDUCTING OR SEMICONDUCTING STATIONARY PHASES

(71) Applicants: PharmaFluidics NV, Zwijnaarde (BE); Thermo Finnigan LLC, San Jose, CA (US)

(72) Inventors: Joshua A. Silveira, Gilroy, CA (US); Eloy R. Wouters, San Jose, CA (US); Bo Claerebout, Kortrijk (BE); Jeff Op de Beeck, Mariakerke (BE); Paul Jacobs, Zwijnaarde (BE)

(73) Assignees: Thermo Finnigan LLC, San Jose, CA (US); PharmaFluidics NV, Ghent (BE)

( * ) Notice: Subject to any disclaimer, the term of this patent is extended or adjusted under 35 U.S.C. 154(b) by 312 days.

(21) Appl. No.: 18/490,260

(22) Filed: Oct. 19, 2023

(65) Prior Publication Data

US 2025/0130207 A1 Apr. 24, 2025

(51) Int. Cl.
　*G01N 30/16*　　(2006.01)
　*B01D 15/38*　　(2006.01)
　*G01N 30/60*　　(2006.01)

(52) U.S. Cl.
　CPC ......... *G01N 30/16* (2013.01); *B01D 15/3885* (2013.01); *G01N 30/6091* (2013.01)

(58) Field of Classification Search
　CPC ............................ G01N 30/16; G01N 30/6091
　USPC ........................................................ 73/61.55
　See application file for complete search history.

(56) References Cited

U.S. PATENT DOCUMENTS

| | | | |
|---|---|---|---|
| 3,987,390 | A | 10/1976 | Kirklen et al. |
| 4,939,633 | A | 7/1990 | Rhodes et al. |
| 4,994,165 | A | 2/1991 | Lee et al. |
| 5,015,845 | A | 5/1991 | Allen et al. |
| 5,389,889 | A | 2/1995 | Towne et al. |
| 5,427,663 | A | 6/1995 | Austin et al. |
| 5,541,490 | A | 7/1996 | Sengupta et al. |

(Continued)

FOREIGN PATENT DOCUMENTS

EP　　　　4131334 A1　　2/2023

OTHER PUBLICATIONS

EP24207161.1, Extended European Search Report, Mar. 21, 2025, 9 pages.

(Continued)

*Primary Examiner* — Peter J Macchiarolo
*Assistant Examiner* — Rodney T Frank

(57) ABSTRACT

Systems, methods, and cartridges taught herein improve chromatographic performance in electrospray systems that feature chromatographic columns having a conductive or semiconductive stationary phase by electrically connecting a fluid junction located upstream of the chromatographic column to a fluid union located downstream of the chromatographic column using an electrical conductor. The electrical conductor creates a voltage equipotential between a first end of the chromatographic column and a second end of the chromatographic column that neutralizes current flow through the chromatographic column. Accurate electrospray current measurements are enabled while post-column peak dispersion and repeatable retention time are achieved.

20 Claims, 7 Drawing Sheets

(56) References Cited

U.S. PATENT DOCUMENTS

| | | | |
|---|---|---|---|
| 6,156,273 A | 12/2000 | Regnier et al. | |
| 6,452,166 B1 | 9/2002 | Enke et al. | |
| 6,617,838 B1 | 9/2003 | Miranda et al. | |
| 6,803,568 B2 | 10/2004 | Bousse et al. | |
| 7,015,728 B1 | 3/2006 | Solic | |
| 7,087,895 B1 * | 8/2006 | Liu | H01J 49/167 |
| | | | 250/281 |
| 7,402,798 B2 | 7/2008 | Staats | |
| 7,839,142 B2 | 11/2010 | Cech et al. | |
| 7,839,143 B2 | 11/2010 | Cech et al. | |
| 8,496,818 B2 | 7/2013 | Benevides et al. | |
| 9,120,107 B1 | 9/2015 | Sauter, Jr. | |
| 9,196,468 B2 | 11/2015 | Campbell et al. | |
| 9,299,553 B2 | 3/2016 | Whitehouse et al. | |
| 9,459,240 B2 | 10/2016 | Vorm | |
| 9,500,621 B2 | 11/2016 | Kotowski et al. | |
| 9,939,471 B1 | 4/2018 | Omoumi et al. | |
| 10,514,360 B1 | 12/2019 | Gentalen et al. | |
| 10,591,450 B2 | 3/2020 | Maeda | |
| 11,029,291 B2 | 6/2021 | Schultz et al. | |
| 2002/0113207 A1 | 8/2002 | Lee et al. | |
| 2003/0215855 A1 * | 11/2003 | Dubrow | G01N 27/44791 |
| | | | 435/7.1 |
| 2005/0258360 A1 | 11/2005 | Whitehouse et al. | |
| 2006/0176074 A1 | 8/2006 | Van Epps et al. | |
| 2008/0038152 A1 | 2/2008 | Van | |
| 2008/0047330 A1 | 2/2008 | Whitehouse et al. | |
| 2009/0152371 A1 | 6/2009 | Stark et al. | |
| 2009/0219009 A1 | 9/2009 | Jansen et al. | |
| 2011/0304339 A1 | 12/2011 | Schumacher et al. | |
| 2012/0153143 A1 | 6/2012 | Kennedy et al. | |
| 2013/0113507 A1 | 5/2013 | Danesh et al. | |
| 2013/0319862 A1 * | 12/2013 | Kotowski | G01N 27/44704 |
| | | | 204/603 |
| 2014/0305801 A1 | 10/2014 | Peterson et al. | |
| 2015/0002136 A1 | 1/2015 | McTigue et al. | |
| 2015/0198571 A1 | 7/2015 | Vorm | |
| 2015/0276812 A1 | 10/2015 | Ferguson | |
| 2016/0003787 A1 | 1/2016 | Wright et al. | |
| 2016/0154029 A1 | 6/2016 | Danesh et al. | |
| 2016/0217994 A1 | 7/2016 | Oleschuk et al. | |
| 2017/0254837 A1 | 9/2017 | Boden | |
| 2017/0322188 A1 | 11/2017 | Dasgupta et al. | |
| 2018/0158662 A1 | 6/2018 | Mellors et al. | |
| 2018/0321302 A1 | 11/2018 | Qu et al. | |
| 2021/0063361 A1 | 3/2021 | Quint et al. | |
| 2021/0159061 A1 | 5/2021 | Silveira et al. | |
| 2021/0210325 A1 | 7/2021 | Mellors et al. | |
| 2021/0343516 A1 | 11/2021 | Silveira et al. | |
| 2023/0010104 A1 | 1/2023 | Gentalen et al. | |
| 2023/0030920 A1 * | 2/2023 | Lindseth | H01J 49/165 |
| 2025/0130207 A1 * | 4/2025 | Silveira | H01J 49/165 |

OTHER PUBLICATIONS

Bruins A.P., "Mechanistic Aspects of Electrospray Ionization," Journal of Chromatography A, Jan. 23, 1998, vol. 794, No. 1-2, XP004115405, pp. 345-357.

Zhao X., et al., "Identification of Nitrate Ester Explosives by Liquid Chromatography-Electrospray Ionization and Atmospheric Pressure Chemical Ionization Mass Spectrometry," Journal of Chromatography A, Nov. 15, 2002, vol. 977, No. 1, XP004390894, pp. 59-68.

Manisali I., et al., "Electrospray Ionization Source Geometry for Mass Spectrometry: Past, Present, and Future," Trends in Analytical Chemistry, 2006, vol. 25, No. 3, pp. 243-256.

Marginean I., et al., "Selection of the Optimum Electrospray Voltage for Gradient Elution LC-MS Measurements," Journal of the American Society for Mass Spectrometry, Apr. 1, 2009, vol. 20, No. 4, XP026010779, pp. 682-688.

Valaskovic G.A., et al., "Automated Orthogonal Control System for Electrospray Ionization," Journal of the American Society for Mass Spectrometry, 2004, vol. 15, pp. 1201-1215.

* cited by examiner

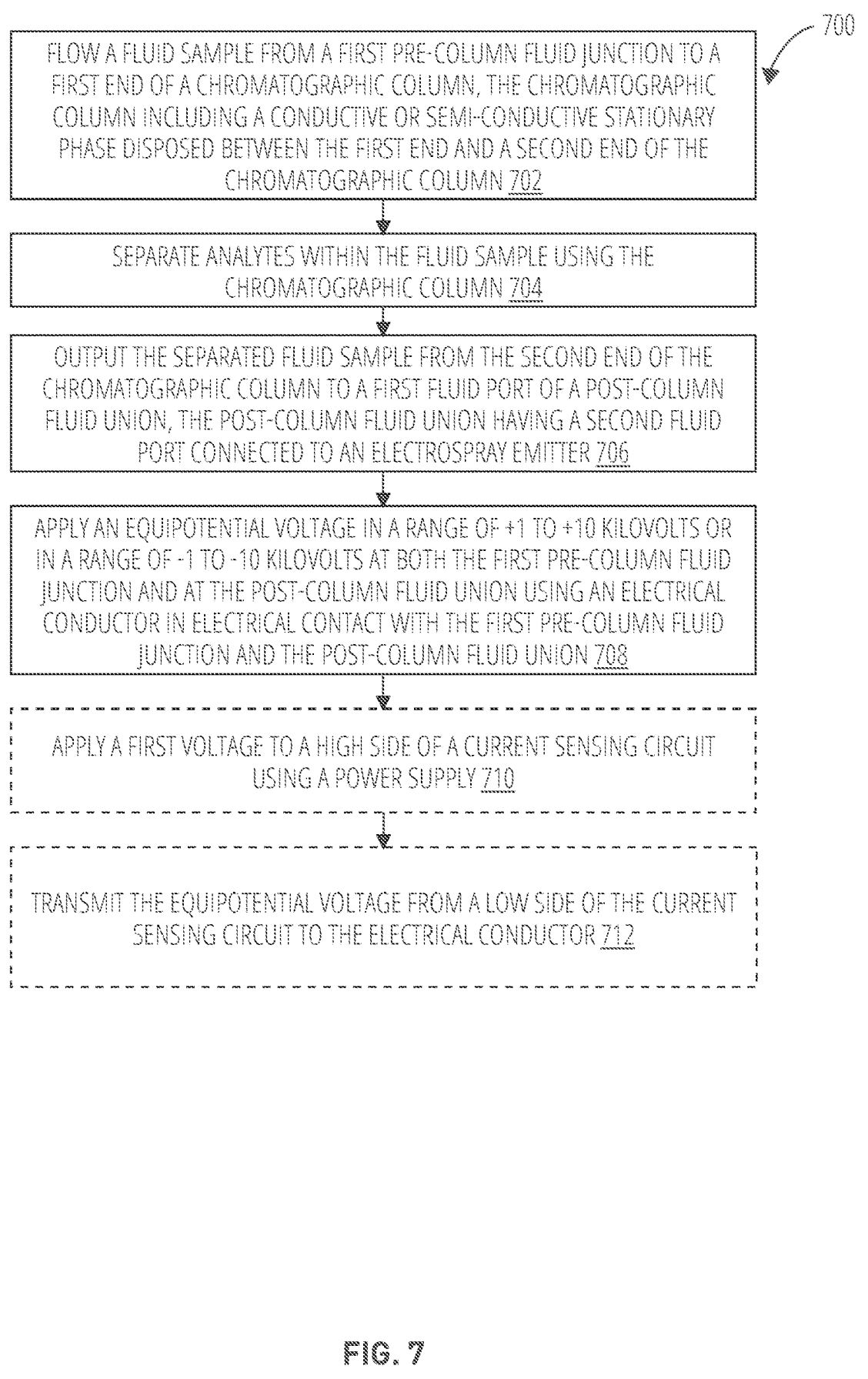

700

FLOW A FLUID SAMPLE FROM A FIRST PRE-COLUMN FLUID JUNCTION TO A FIRST END OF A CHROMATOGRAPHIC COLUMN, THE CHROMATOGRAPHIC COLUMN INCLUDING A CONDUCTIVE OR SEMI-CONDUCTIVE STATIONARY PHASE DISPOSED BETWEEN THE FIRST END AND A SECOND END OF THE CHROMATOGRAPHIC COLUMN 702

SEPARATE ANALYTES WITHIN THE FLUID SAMPLE USING THE CHROMATOGRAPHIC COLUMN 704

OUTPUT THE SEPARATED FLUID SAMPLE FROM THE SECOND END OF THE CHROMATOGRAPHIC COLUMN TO A FIRST FLUID PORT OF A POST-COLUMN FLUID UNION, THE POST-COLUMN FLUID UNION HAVING A SECOND FLUID PORT CONNECTED TO AN ELECTROSPRAY EMITTER 706

APPLY AN EQUIPOTENTIAL VOLTAGE IN A RANGE OF +1 TO +10 KILOVOLTS OR IN A RANGE OF -1 TO -10 KILOVOLTS AT BOTH THE FIRST PRE-COLUMN FLUID JUNCTION AND AT THE POST-COLUMN FLUID UNION USING AN ELECTRICAL CONDUCTOR IN ELECTRICAL CONTACT WITH THE FIRST PRE-COLUMN FLUID JUNCTION AND THE POST-COLUMN FLUID UNION 708

APPLY A FIRST VOLTAGE TO A HIGH SIDE OF A CURRENT SENSING CIRCUIT USING A POWER SUPPLY 710

TRANSMIT THE EQUIPOTENTIAL VOLTAGE FROM A LOW SIDE OF THE CURRENT SENSING CIRCUIT TO THE ELECTRICAL CONDUCTOR 712

FIG. 7

SYSTEMS AND METHODS FOR ELECTROSPRAY USING CHROMATOGRAPHIC COLUMNS WITH CONDUCTING OR SEMICONDUCTING STATIONARY PHASES

BACKGROUND

Electrospray ionization (ESI) is a technique used in mass spectrometry (MS). More specifically, ESI is a "soft" ionization technique extensively used for production of gas phase ions with low levels of fragmentation. In a typical ESI process, a high voltage is applied to a liquid to create charged droplets which desolvate to form gas phase ions. Low flow electrospray, or "NanoESI," produces charged droplets from an emitter having a relatively small inner diameter (e.g., approximately 20 micrometers or less). The combination of low flow rate and small diameter results in increased ionization efficiency (i.e., increased ratio of gas phase ions produced per available analyte molecules in solution) and allows for a reduction in the amount of sample required. When this emitter is positioned near a mass spectrometer inlet, which serves as a counter electrode, the gas phase ions produced are sampled into the instrument for mass analysis.

ESI is commonly used to couple the output of a chromatography column or system to mass spectrometry (MS). Chromatography techniques such as liquid chromatography (LC) can be used to create temporal separation between molecules in solution. The eluate can be fed to an electrospray emitter to serve as the input for the mass spectrometer.

BRIEF SUMMARY

Provided herein is an electrospray system. The electrospray system includes a first pre-column fluid junction to receive a fluid sample. The electrospray system includes a chromatographic column for separating analytes within the fluid sample. The chromatographic column includes a conductive or semi-conductive stationary phase disposed between a first end and a second end of the chromatographic column. The first end is fluidically connected to the first pre-column fluid junction. The electrospray system includes a post-column fluid union having a first fluid port and a second fluid port. The first fluid port receives separated analytes in the fluid sample from the second end of the chromatographic column. The electrospray system includes an electrospray emitter fluidically connected to the second fluid port. The electrospray system includes an electrical conductor connected to the post-column fluid union and the first pre-column fluid junction to equalize electrical potential between the post-column fluid union and the first pre-column fluid junction.

Provided herein is a method for reducing electro-chromatographic effects in an electrospray system. The method includes flowing a fluid sample from a first pre-column fluid junction to a first end of a chromatographic column. The chromatographic column includes a conductive or semi-conductive stationary phase disposed between the first end and a second end of the chromatographic column. The method includes separating analytes within the fluid sample using the chromatographic column. The method includes outputting the separated fluid sample from the second end of the chromatographic column to a first fluid port of a post-column fluid union The post-column fluid union has a second fluid port connected to an electrospray emitter. The method includes applying an equipotential voltage in a range of +1 to +10 kilovolts or in a range of −1 to −10 kilovolts at both the first pre-column fluid junction and at the post-column fluid union using an electrical conductor in electrical contact with the first pre-column fluid junction and the post-column fluid union.

Provided herein is a cartridge for insertion into an electrospray system. The cartridge includes a first pre-column fluid junction to receive a fluid sample The cartridge includes a chromatographic column for separating analytes within the fluid sample. The chromatographic column includes a conductive or semi-conductive stationary phase disposed between a first end and a second end of the chromatographic column. The first end is fluidically connected to the first pre-column fluid junction. The cartridge includes a post-column fluid union having a first fluid port and a second fluid port. The first fluid port receives separated analytes in the fluid sample from the second end of the chromatographic column. The cartridge includes an electrospray emitter fluidically connected to the second fluid port. The cartridge includes an electrical conductor connected to the post-column fluid union and the first pre-column fluid junction to equalize electrical potential between the post-column fluid union and the first pre-column fluid junction.

BRIEF DESCRIPTION OF THE SEVERAL VIEWS OF THE DRAWINGS

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

FIG. 7 illustrates a routine for reducing electro-chromatographic effects in an electrospray system, in accordance with various embodiments taught herein.

DETAILED DESCRIPTION

Figure 1:
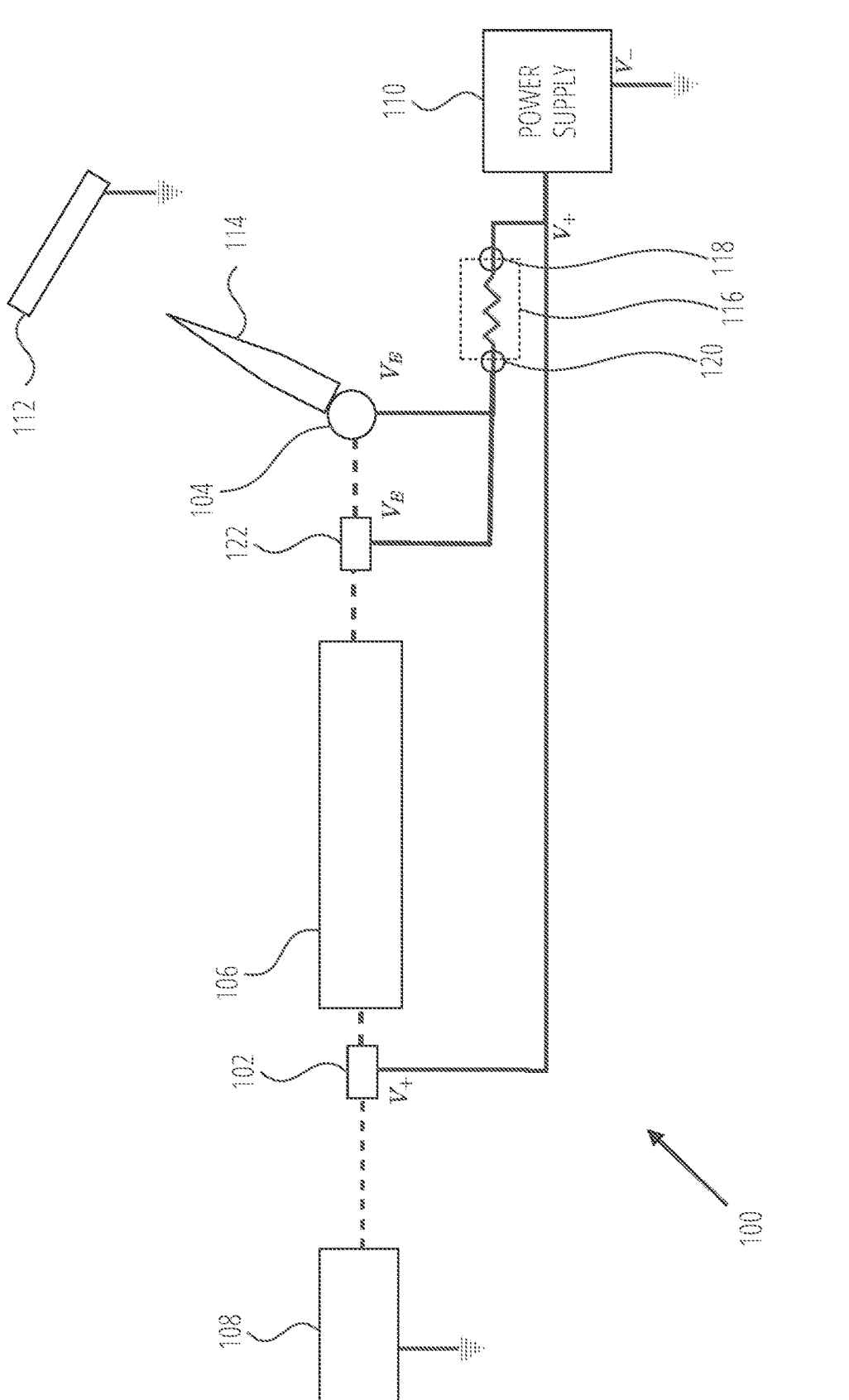
FIG. 1 schematically illustrates a conventional electrospray system including a chromatographic column with a non-conductive stationary phase.

Systems, methods, and cartridges taught herein improve chromatographic performance in electrospray systems that feature a chromatographic column having stationary phase (s) formed of conductive or semi-conductive materials or substrates. In conventional electrospray systems, the electrical setup allows leakage currents to pass through the eluent. Such an arrangement is not suitable for use with a chromatographic column having a conductive or semiconductive stationary phase because current flow through such conductive columns causes charging of the column over time that subsequently generates adverse interactions with analytes during analyte separation in the column. Systems, methods, and cartridges taught herein overcome this problem by electrically connecting a fluid junction located upstream of the chromatographic column to a fluid union located downstream of the chromatographic column using an electrical conductor. The electrical conductor creates a high voltage equipotential between a first end of the chromatographic column and a second end of the chromatographic column that limits or eliminates current flow through the chromatographic column.

Systems, methods, and cartridges taught herein also enable measurement of electrospray current in systems using chromatographic columns having conductive or semi-conductive stationary phases while maintaining high chromatographic performance. In conventional systems, the current monitoring circuit is connected between a power supply and an electrospray emitter in such a way that slightly different voltages are applied to the ends (i.e., inlet and outlet) of the chromatographic column. In systems, methods, and cartridges taught herein, the electrical conductor that connects the fluid junction and the fluid union is connected in series with the current monitoring circuit. As such, no current flows through the chromatographic column having a conductive or semiconductive stationary phase but accurate measurement of the electrospray current is still enabled.

According to some embodiments taught herein, electrospray systems, methods, and cartridges taught herein enable improved chromatographic performance by including the fluid union as the only post-column fluidic connection. The chromatographic column creates temporal separation of analytes in solution, and analyte bands travel to the electrospray emitter. Each fluidic connection through which the analyte bands pass en route to the electrospray emitter can create disturbances to the laminar fluid flow (e.g., flow eddies). Additionally, unswept (no-flow) volumes are created at each fluidic connection within which the analytes diffuse (passive transport). Because this is a much slower process than active transport, a part of the analyte plug or band will lag behind the bulk of the plug causing a "tailed plug." These processes impact the quality of the separation as they lead to dispersion of the analyte bands, or so called "band broadening". In systems, methods, and cartridges taught herein, the use of the electrical conductor enables true equipotential between ends of the column while using only a single post-column fluidic connection (i.e., the fluid union). Thus, the systems and methods according to some embodiments herein can improve chromatographic performance (e.g., reducing peak broadening as compared to conventional systems and regulating retention time) by avoiding charging of the conductive or semiconductive stationary phase in the chromatographic column and limiting the number of post-column fluidic connections to one.

Accurate current-to-voltage curves (i.e., current flow through electrospray emitter as function of applied voltage) are important for characterizing, diagnosing, and optimizing an electrospray system. Such curves assist with differentiating between various electrospray regimes that principally govern the sensitivity of the instrumentation. In a first electrospray regime, the electrospray voltage ($V_E$) is below a threshold value with the result that the emitter emits no spray or dripping fluid. For example, the first electrospray regime can occur below 1,200 volts in some embodiments. A second electrospray regime occurs where the applied electrospray voltage ($V_E$) is sufficient to cause electrospray within the stable spindle regime where charged droplets are formed directly from a filament that extends from the Taylor cone. For example, the second regime can occur when the electrospray voltage is in a range from 1,200 to 2,200 volts. In a third regime, the applied electrospray voltage results in a cone jet where truncation of the filament is aided by coulombic repulsion thereby creating a diffuse plume of charged droplets. For example, the third regime can occur when the electrospray voltage is over 2,200 volts. The three electrospray regimes are characterized by abrupt changes in slope on a graph of spray current as a function of applied voltage. Embodiments of the present disclosure allow precise determination of spray current as function of applied voltage and so enable creation of such a graph. On the I-V graph, the inverse of slope (i.e., 1/slope) represents the effective impedance for given parameters such as flow rate, tip diameter, fluid composition, etc. This knowledge is important at least for setup, spray optimization, and diagnostics, and other methods to obtain the effective impedance (including processing images of the electrospray plume) are complicated and time-consuming. Thus, embodiments taught herein can enable improvement or optimization of the spray by direct measurement of the electrical properties without complex imaging algorithms or associated techniques.

Additionally, changes in the current-to-voltage characteristic for an electrospray system or cartridge are indicative of system or cartridge health. Thus, monitoring these characteristics with a controller can provide a diagnostic tool to assess system or cartridge health. One of the benefits of the electrical arrangement taught in embodiments describe herein is that the improved fidelity of the current measurement readback enables direct measurement and software automation of health and operation information for the electrospray system that would otherwise have to be obtained from an optical inspection apparatus of the ESI plume.

However, conventional systems and methods to measure the electrospray current have notable shortcomings, particularly for systems with chromatographic columns having a conductive or semiconductive stationary phase. Off-the-shelf power supplies, while most often outfitted with current and voltage monitor outputs, will only report the total load current. In reality, there are unknown leakage or spurious paths for current flow created by the conductive fluid streams themselves and by conductive elements in the fluidic path. To obtain an accurate measure of ESI current, other current flows must be either ignored or subtracted from the whole. This requires a separate independent measure of spray current which is not typically available by the high voltage supply manufacturer. Any other loads, whether intentional or unintentional, must also be accounted for. The problem is further compounded when considering that these extremely small currents (e.g., requiring greater than 10 nanoamps of precision) are measured in the presence of an extremely high common mode voltage. For the case of a ±8 kilovolt power supply, the measurement circuit typically uses a minimum common mode rejection on the order of 100 decibels or more. Additionally, tolerance matching of high voltage and high ohm resistors is needed to better than 0.01% accuracy.

Systems, methods, and cartridges taught herein enable accurate measurement of electrospray current in electrospray systems that include chromatographic columns having conductive or semiconductive stationary phases by using an electrical conductor in series with a current sensing circuit to create a voltage equipotential between the pre-column fluid junction located at a first end of the chromatographic column and a post-column fluid union located at a second end of the chromatographic column.

Figure 2:
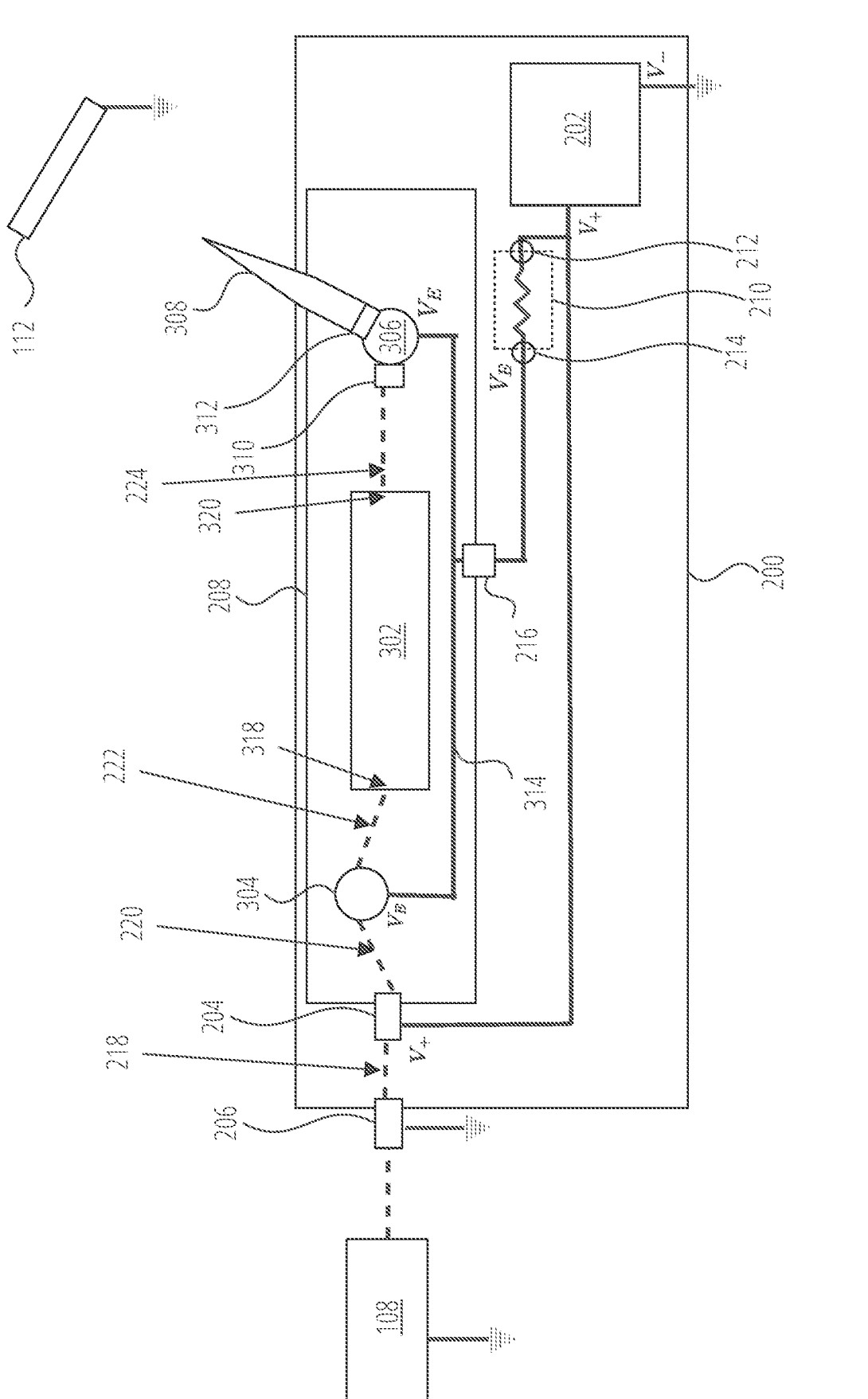
FIG. 2 illustrates a schematic view of an electrospray system with a chromatographic column having a conductive or semiconductive stationary phase in accordance with some embodiments taught herein.
Figure 3:
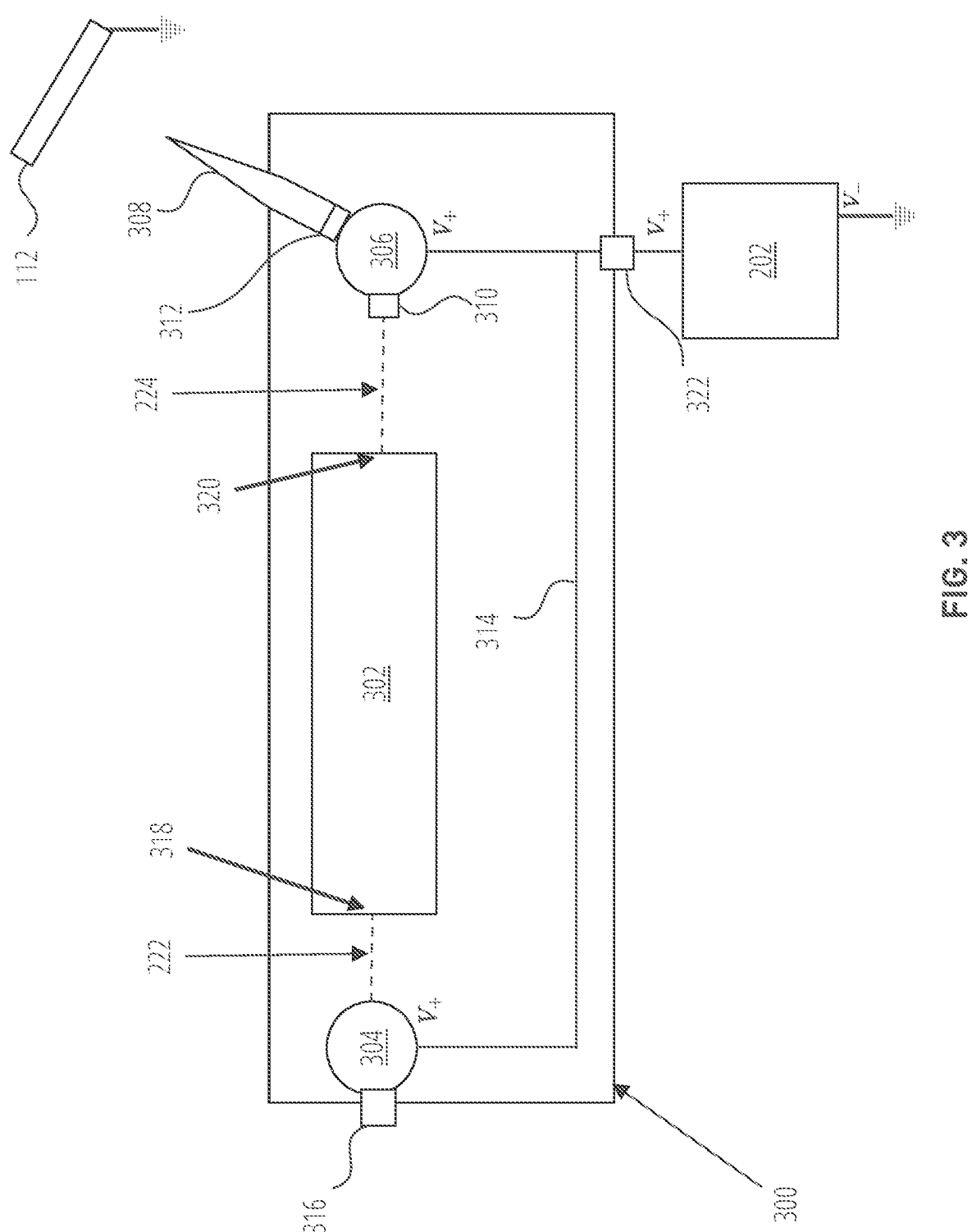
FIG. 3 depicts a schematic view of an alternative electrospray system with a chromatographic column having a conductive or semiconductive stationary phase in accordance with some embodiments taught herein.

FIG. 1 schematically illustrates a prior art electrospray system 100 including a chromatographic column 106 with non-conductive stationary phase (e.g., packed polymer or glass beads). In FIG. 1, FIG. 2, and FIG. 3 of this document, dashed line connections between components denote fluidic pathways while solid line connections between elements denote electrical pathways. The prior art electrospray system 100 includes a fluid junction 102, the chromatographic column 106 having a non-conductive stationary phase, a post-column fluid union 104, a post-column fluid junction 122, and an electrospray emitter 114. A fluid sample is supplied to the electrospray system 100 from a liquid chromatography system 108 via the fluid junction 102. The fluid sample travels from the pre-column fluid junction 102 through the chromatographic column 106. The chromatographic column 106 temporally separates analytes within the fluid sample and outputs a separated fluid sample (i.e., a fluid sample including separated analytes). The separated fluid sample flows to the post-column fluid junction 122 and then to post-column fluid union 104 before being emitted out through the electrospray emitter 114. A power supply 110 is connected to the fluid junction 102 and to a high side 118 of a current sensing circuit 116. A low side 120 of the current sensing circuit 116 is connected to the fluid union 104 and the post-column fluid junction 122. When a sufficient voltage is applied at the fluid union 104, fluid at the electrospray emitter 114 is ionized and forms a stream of droplets that are propelled from the electrospray emitter 114 to a counter electrode 112. The counter electrode 112 and a negative terminal are connected to a common ground (which may be Earth ground in some cases). Thus, the flow of ionized droplets completes an electrical circuit and produces a measurable current flow.

In some embodiments, the counter electrode 112 could be floated at an offset voltage referenced to ground, the offset voltage being small (less than 200V) relative to the electrospray voltage from power supply 110. In some embodiments, an atmosphere-to-vacuum-inlet of a mass spectrometer can serve as the counter electrode 112. In embodiments that include a small float offset voltage, another ion optical element in the mass spectrometer can be held at ground (e.g., a c-trap) thereby allowing for ions to be guided by ion optical elements held at progressively lower (or higher, depending on their polarity) voltages.

In FIG. 1, the current sensing circuit 116 is arranged in series with the fluid union 104 and the post-column fluid junction 122 and measures the current flowing from the power supply 110 to the fluid union 104. The conventional electrospray system 100 attempts to divert leakage currents out of the measurement path of the current sensing circuit 116 by applying a common voltage to the fluid union 104 and the post-column fluid junction 122 while high voltage is applied to the fluid junction 102. In some instances, no voltage $V_+$ is applied at the fluid junction 102. If no voltage is applied to pre-column fluid junction 102, leakage current occurs as current flows through the conductive fluid stream to the grounded liquid chromatography system 108. In this application, "leakage current" refers to current from the power supply that does not travel to the electrospray emitter and counter electrode but, rather, travels along a separate path away from the emitter to ground (e.g., along a path through the fluid sample to upstream of the chromatographic column and to the grounded liquid chromatography system 108). Leakage current can prevent accurate measurement of the electrospray current if the leakage current is measured by the current sensing circuit but does not travel through the electrospray emitter to ground.

The application of the voltage $V_+$ at the fluid junction 102 is insufficient to eliminate leakage currents across the chromatographic column 106 because the voltage $V_+$ is not equal to the voltage $V_E$ that is applied to the fluid union. The difference can arise due to a non-zero voltage drop across the current sensing circuit 116 and other factors such as different contact resistances or material compositions of the fluid junction or the fluid union. Because of the very high voltages involved, even a small difference between $V_+$ and $V_E$ can enable leakage current of the order of the spray current. The same issue of current leakage arises if the voltage $V_+$ is removed from the fluid junction 102 because current will then leak through to the grounded liquid chromatography system 108. However, these conventional systems include chromatographic columns with non-conductive stationary phases. A substantial voltage drop (up to thousands of volts) can exist across such chromatographic columns 106 without impacting the performance of the chromatographic separation because the non-conductive stationary phase operates similarly whether it is in the presence or absence of current flow due to the voltage drop.

In other conventional schemes, the pre-column fluid junction 102 and the post-column fluid junction 122 are kept at ground potential (i.e., substantially zero volts). In such schemes, the stationary phase of the chromatographic column 106 is not subjected to current flow. However, such an arrangement is disfavored as it does not allow for accurate measurement of electrospray current alone using the current sensing circuit 116 because the current sensing circuit 116 will measure both electrospray current and the leakage current that arises between the post-column fluid union 104 and the post-column fluid junction 122.

The setup of FIG. 1 creates problems in use of a chromatographic column having a conductive or semiconductive stationary phase. Leakage current through a chromatographic column having a conductive or semiconductive stationary phase can induce charging that affects the flow and retention time of analytes within the column as taught in greater detail below with respect to FIG. 4. Performance degradation can occur with even a small voltage drop across the chromatographic column (e.g., a voltage drop as small as 10 V). Additionally, the presence of two liquid-metal interfaces (i.e., the post-column liquid junction 122 and the fluid union 104) creates two locations where flow perturbations can impair the quality of analyte separation in the separated fluid sample leaving the chromatographic column as each liquid-to-metal interface contributes to dispersion of the analyte bands, or so called "band broadening."

The systems, methods, and cartridges taught herein mitigate these issues of leakage currents and band broadening by creating a true non-zero voltage equipotential (e.g., in a range of +1 kV and +10 kV or in a range of −1 kV and −10 kV) between the ends of a chromatographic column having a conductive or semiconductive stationary phase. Additionally, band broadening effects are mitigated because the systems taught herein reduce the number of post-column fluid junctions (e.g., fluid-metal interfaces) from two to one.

FIG. 2 illustrates a schematic view of an electrospray system 200 with a chromatographic column 302 having a conductive or semiconductive stationary phase in accordance with some embodiments taught herein. In FIG. 2, the dashed line connections between components indicate fluidic connections while solid line connections between components indicate electrical connections. The fluidic components of the electrospray system 200 include a pre-column fluid junction 206 (which can be a bulkhead fitting or other fluidic system inlet or interface in some instances), a pre-column fluid junction 204 (which can be a needle seat or fluidic cartridge inlet or interface in some instances), a pre-column fluid junction 304 (which can be an intra-cartridge fluidic junction in some instances), a chromatographic column 302 having a conductive or semiconductive stationary phase, a post-column fluid union 306, and an electrospray emitter 308. The electrospray system 200 also can include electrical components such as a power supply 202, a current sensing circuit 210, and electrical conductors to electrically connect components to one another. In particular, an electrical conductor 314 connects the fluid union 306 and the fluid junction 304 to equalize the electrical potential between the fluid union 306 and the fluid junction 304. By applying an equal electrical potential (for example, the high electrical voltage potential $V_E$ employed in electrospray emission) to both the fluid union 306 and the fluid junction 304, the possibilities for electrical current leakage and electrochemical interactions in the chromatographic column 302 are further reduced or eliminated while, at the same time, the chromatographic column 302 can be floated at a high electrical potential.

A fluid sample enters the electrospray system 200 through the pre-column liquid junction 206. The source of the fluid sample can be an external reservoir or external liquid chromatography system 108. In some examples, the external liquid chromatography system 108 is responsible for delivering the solvent, loading the sample, and running the gradient. The fluid sample flows along fluidic path 218 to the pre-column fluid junction 204. The fluid sample then flows along fluidic path 220 to the fluid junction 304. In embodiments where some components are assembled into a cartridge format (described in greater detail below), this is the point at which the fluid sample has entered the cartridge. The fluid sample flows from the fluid junction 304 along fluidic path 222 to a first end 318 of the chromatographic column 302. In the chromatographic column 302, analytes of the fluid sample are temporally separated within the fluid sample such that a separated fluid sample (i.e., a fluid sample including separated analytes) is output from a second end 320 of the chromatographic column 302. For example, the chromatographic column 302 can be configured for, for example, liquid chromatography (LC) to separate molecules in a liquid mobile phase. The separated fluid sample is eluted from the chromatographic column and travels along a fluidic path 224 to a first fluid port 310 of the fluid union 306. The fluid sample is ionized by a high electrical potential ($V_E$) applied at the fluid union 306. The electrospray emitter 308 is connected to a second fluid port 312 of the fluid union 306. The ionized fluid stream is emitted from the electrospray emitter 308 as ionized droplets. For example, the electrospray emitter 308 can include a needle and the droplet can be ejected through a distal tip of the needle. In some embodiments, the electrospray emitter 308 has an inner diameter of less than about 30 micrometers to enable nanoESI. In some embodiments, the emitted ionized droplets leave the electrospray emitter 308 and travel towards an atmospheric pressure inlet to a mass spectrometer that serves as a counter electrode 112. The electrospray current return is commonly formed by the electrically grounded counter electrode 112 as shown in FIG. 2.

The power supply 202 is electrically connected to a high side 212 of a current sensing circuit 210 to measure the electrospray current arising from the flow of ionized droplets between the electrospray emitter 308 and a counter electrode 112. In some embodiments, the power supply 202 outputs a high voltage in a range of ±1 kV to ±10 kV. For example, the power supply 202 may output a voltage of ±2 kV or ±8 kV. The low side 214 of the current sensing circuit 210 is connected to an electrical conductor 314 that further connects to the fluid junction 304 and the fluid union 306. In other words, the fluid junction 304 and the fluid union 306 are electrically connected in parallel with one another through the electrical conductor 314, and this parallel circuit is connected in series with the current sensing circuit 210. Thus, the electrical conductor 314 creates a true equipotential between the fluid junction 304 and the fluid union 306 as there are no intervening elements between the two (such as the current sensing circuit 210) to create a difference in potential. In essence, the two pre-column fluid junctions 206 and 208 form a pre-column voltage spacer that directs current around the chromatographic column to prevent current flow through the chromatographic column. As a consequence of employing the pre-column voltage spacer, a small amount of voltage is dropped across the fluidic line 220 while the majority of the voltage drop occurs along fluidic line 218. The use of a pre-column voltage spacer can be contrasted with the post-column voltage spacer arrangement in the conventional electrospray system 100 of FIG. 1 wherein improvement in the electrospray current measurement is accompanied by a small voltage drop across the conductive or semi-conductive stationary phase of the chromatographic column that can lead to undesirable charging effects that impact retention time. The post-column voltage spacer of FIG. 1 also negatively induces band broadening due to the presence of two liquid-to-metal interfaces.

In some embodiments, a lead of the electrical conductor 314 is connected directly to an outer conductive surface of the fluid union 306 to provide electrical current to the fluid stream sufficient to provide ionization therein. In some embodiments, a lead of the electrical conductor 314 is connected directly to an outer conductive surface of the fluid junction 304. In some embodiments, the electrical conductor 314 can include an electrical wire or cable and can include shielding or be a bare conductor.

Note that the power supply 202 can be supplied with the electrospray system 200 in some embodiments as a combined system. In other embodiments, the power supply 202 is not provided as part of the system but, rather, the electrospray system 200 is designed to interface with a power supply 202 that is provided separately. In some embodiments, the polarity of the power supply 202 is reversed such that high voltage is applied to the counter electrode 112 and the return voltage lead of the power supply 202 is connected to the current sensing circuit 210.

NanoESI plumes typically carry between 50 to 500 nano Amperes of current. As such, because nanoESI results in greater sensitivity and produces relatively small ion currents, measurements are made of these small ion currents to 10 nano Amperes or better of measurement resolution as it is highly desirable to measure the electrospray current to a high degree of accuracy to ensure that the electrospray emitter 308 is operating in the correct electrospray regime. Because a voltage drop occurs across the current sensing circuit 210, the voltage $V_+$ at the high side 212 does not match the voltage $V_E$ at the low side 214. The voltage $V_E$ is applied in parallel at the fluid union 306 and the fluid junction 304. In some embodiments, the electrical connectors pass through a high-voltage electrical connector 216 that can be mounted, for example, on a housing of the cartridge 208.

The liquid chromatography system 108, pre-column fluid junction 206 (e.g., system inlet), counter electrode 112, and negative terminal of the power supply 202 are connected to electrical ground. It should be understood that "electrically grounded" as used herein may also include electrical potentials operated at or near electrical grounds, or substantial electrical grounds. For example, in some instances, the electrical grounds may be biased up to +/−150 volts, which when compared to the +/−2 to 10 kilovolts of common mode voltage taught herein, represents a substantially grounded source.

The chromatographic column 302 includes conductive or semi-conductive materials or substrates that form and/or support the stationary phase. For example, the stationary phase of the chromatographic column 302 can include (or be formed of) silicon, gallium arsenide, gallium nitride, indium tin oxide, n-type or p-type semiconductor materials, or doped semiconductors. In other embodiments, the stationary phase of the chromatographic column 302 can include conductive metals such as platinum or stainless steel. In some embodiments, the stationary phase of the chromatographic column 302 includes or is supported by a conductive or semi-conductive substrate that is disposed between a first end 318 and a second end 320 of the chromatographic column 302. In some embodiments, the chromatographic column 302 can have a resistivity in a range from $1 \times 10^{-2}$ $\Omega$·cm to $1 \times 10^2$ $\Omega$·cm.

In some embodiments, the chromatographic column 302 can include microfabricated structural features such as pillars extending from a substrate within a microfluidic flow channel. The microfluidic structural features include a conductive or semi-conductive material such as silicon and can be generated using micro- or nano-fabrication techniques known to one of ordinary skill in the art including, for example, using photo- or electron-beam lithography and deep reactive ion etching. The pillars form the stationary phase of the chromatographic column. In some examples, the pillars or other microfluidic structural features are formed from a silicon substrate by etching voids surrounding the pillars. Examples of devices appropriate for use as chromatographic columns in embodiments taught herein are described in U.S. Patent Application Publication No. 2016/0001199, the entire contents of which is incorporated herein by reference. In some embodiments, microfluidic columns consist of rectangular channels that have been etched into microfluidic chips (e.g., semiconductor chips or substrates) using deep reactive etching technology. Certain features of the electrospray system 300, such as the pre-column fluid junction 304 and/or the post-column fluid union 306, can also be integrated directly onto the microfluidic chip. In some instances, the fluid junction 304 can be located on-chip directly adjacent to the first end 318 of the chromatographic column 302 thus reducing or eliminating the fluidic path 222. In some instances, the fluid union 306 can be located on-chip directly adjacent to the second end 320 of the chromatographic column 302 thus reducing or eliminating the fluidic path 224. In some embodiments, silanols in the conductive or semiconductive stationary phase of the chromatographic column 302 are chemically end-capped so that secondary (e.g., electrochemical) interactions with analytes are reduced. Similarly, the outer layer of the conductive or semiconductive stationary phase of some examples can be chemically treated to form a layer of a different material, such as by changing silicon into silicon oxide, or can be coated with thin layers of other materials to reduce analyte interactions. As opposed to chromatographic columns with non-conductive stationary phases, which usually include a heterogeneously packed bed of functionalized spherical particles (e.g., fused silica particles) as stationary phase, the bed in conductive or semiconductive microfluidic/microfabricated chromatographic columns is formed by etching pillars located at uniform distances. Compared to packed bed columns, microfluidic chromatographic columns offer several advantages. First, peak dispersion originating from heterogenous flow paths across the column cross-section (e.g., eddy dispersion), which arises in heterogeneous packed-bed columns, is reduced in chromatographic columns having microfabricated or deep reactive ion etched features such as pillars due to the homogeneous spacing between features. Second, column permeability is increased. Finally, the homogeneity of microfabricated chromatographic columns creates excellent column-to-column reproducibility.

In other embodiments, the chromatographic column 302 can include other conductive or semi-conductive stationary phase materials such as porous graphitic carbon beads.

The use of chromatographic columns with conductive or semiconductive stationary phases in conjunction with electrospray emitters has been limited by issues that arise due to electrical conductivity of the stationary phase. For example, doped semiconductor substrates and materials (e.g., a boron-doped semiconductor) include impurities that create holes (unoccupied electron states), making it an electron acceptor. The substrates do not conduct these holes well, leading to an accumulation of charges. In effect, current flow through the chromatographic column can cause charging of the stationary phase in the chromatographic column that, in turn, interacts with the analytes during the separation. Similarly, having a voltage difference between the first end and the second end of the chromatographic column can generate electrochemically induced changes in the pH of the solvents in the fluid sample that eventually affect the stationary phase of the chromatographic column to worsen chromatographic outcomes. In addition, potential differences between the fluid sample and the chromatographic column, or between parts of the chromatographic column, can promote unwanted electrochemistry such as oxidation or reduction of solvent or analyte species in the fluid sample. These electrical issues are magnified at high voltages (i.e., kilovolts) because leakage currents are harder to ignore (become less negligible) under high voltage conditions. In some conventional systems, these disadvantages have been mitigated by effectively grounding the chromatographic column by introducing the additional post-column fluid junction 122 between the post-column fluid union 104 and the second end of the chromatographic column 302 as shown in FIG. 1. The additional post-column fluid junction can be electrically grounded thus preventing current flow into the chromatographic column. However, each liquid-to-metal interface in the system downstream of the chromatographic column introduces additional dispersion in the chromatography peaks (i.e., undoes the work of the chromatographic column to separate analytes from one other). Thus, the additional post-column fluid junction 122 of the conventional system introduces additional peak dispersion. The use of an electrical conductor 314 as taught herein to equilibrate electrical potential across the chromatographic column resolves these issues while still enabling floating of the chromatographic column at high voltage and enabling high resolution measurement (e.g., to nanoamp levels) of the electrospray current by the current sensing circuit 210. Additionally, the only post-column liquid-to-metal interfaces in electrospray system 200 occur at the fluid union 306 where electrospray is initiated, thus reducing peak dispersion in the fluid sample.

In some embodiments, the fluidic or electrical components can be housed within a cartridge 208. As used herein, "housed" within the cartridge indicates that the component is mounted at least partially within the cartridge although some elements may extend out of the outer housing or casing of the cartridge. In some embodiments, use of a cartridge format can, in some cases, make expert-level liquid-chromatography mass spectrometry (LCMS) performance easier to attain by integrating the column and emitter into a cartridge format that also contains nebulization gas for consistent desolvation, an integrated heater for optimal chromatography, and on-board memory enabling use as a "smart consumable." The integrated heater can provide thermal stability and reduce the level of backpressure needed to achieve suitable results. In some microfluidic and/or cartridge-based examples, the integrated heater is particularly useful for reducing the backpressure as components of the cartridge 208 may have lower pressure limits than would be achieved by a state-of-the-art liquid chromatography pump. For example, components of the cartridge 208 such as the chromatography column may have a backpressure limit of 450 bar, and the integrated heater enables good performance even at the lower backpressure limit. The cartridge 208 can be a removable and replaceable component that is inserted or withdrawn from the electrospray system 200 in some embodiments. For example, the removable or replaceable cartridge 208 can be inserted into a receiving slot in a system housing. Insertion of the cartridge can facilitate fluidic connection between the pre-column fluid junction 204 and fluidic path 218, while removal of the removable cartridge 208 from the electrospray system 200 can facilitate breaking of the fluidic connection between the pre-column fluid junction 204 and the fluidic path 218. Similarly, insertion of the cartridge into the electrospray system 200 can facilitate electrical connection of the low side of the current sensing circuit 210 to the electrical conductor 314 through the high-voltage electrical connector 216 while removal of the cartridge 208 from the system can facilitate disengagement or breaking of the electrical contact between the current sensing circuit 210 and the high-voltage electrical connector 216. In some embodiments, the housing or casing of the cartridge 208 is formed of non-conductive materials. In some embodiments, the cartridge 208 is sealed or sealable to prevent user contact with high voltages present inside the cartridge 208 during operation and improve safe handling of the cartridge.

Placement of the fluid junction 304 and fluid union 306 within the cartridge 208 can advantageously provide additional electrical shielding of these components to ensure that voltage equipotential conditions are maintained and to improve safety by preventing users from coming into physical contact with high voltages. Even small resistivity differences along the electrical connections due to differences in electrical cables, electrical contact points, condition of fluidic unions and junctions, and fluidic union or junction surface states such as amount of oxidation on the surface can generate measurable leakage currents that can impact chromatography performance. Placement of the fluid junction 304 and fluid union 306 within the cartridge 208 can prevent subsequent movement of these fluidic parts as pressurized fluid samples are transmitted through them, thus ensuring improved electrical contact between the electrical conductor 314 and these components.

FIG. 2 illustrates the current sensing circuit 210 as being outside of the cartridge 208. However, it is also contemplated that the current sensing circuit 210 could be located within the cartridge 208. In such an embodiment, the current sensing circuit 210 is placed in series between the high-voltage electrical connector 216 and the electrical conductor 314. For example, the power supply 202 and the high side 212 of the current sensing circuit 210 can connect through the high-voltage electrical connector 216 and the low side 214 of the current sensing circuit 210 can connect directly to the electrical conductor 314 without the intervening high-voltage electrical connector 216.

The pre-column fluid junction 204 can have an inner diameter in a range from 50 microns to 500 microns in some embodiments. In an example embodiment, the pre-column fluid junction 204 can have an inner diameter of 280 microns. In some embodiments, the fluid junction 304 can include one or more conductive materials. For example, the fluid junction 304 can include a noble metal or stainless steel. In some embodiments, the fluid junction 304 or fluid union 306 can include multi-port plumbing fixtures or fittings known to those in the art. In some embodiments, the fluid junction 304 and fluid union 306 are identical parts in terms of material composition, shape, or both material composition and shape. In practical implementations, different electrical and fluidic connections can give rise to different resistivities. By using identical material or identical shaped parts for the fluid junction 304 and fluid union 306, differences in contact resistance may be reduced. Unwanted ground currents can arise within the system such as through the housing. In some embodiments, the housing is formed of a non-conductive material.

In some embodiments, the pre-column fluid junction 204 and the fluid junction 304 can be merged into a combined fluid junction. In such embodiments, the fluidic path 220 is eliminated and the combined fluid junction is held at the emitter voltage $V_E$.

In some embodiments, the fluid union 306 can include one or more conductive materials. For example, the fluid union 306 can include stainless steel. The fluid union 306 as depicted in FIG. 2 and FIG. 3 is a two-port device (i.e., the fluid union 306 includes a first fluid port 310 and a second fluid port 312). However, it may be desirable in LC-MS procedures to add certain chemicals to the mobile phase or introduce certain chemicals to the separated fluid sample after it leaves the chromatographic column but prior to electrospray emission to influence analyte ionization in order to improve analyte signal. Alternatively, some additives may be used to suppress unwanted signals or selectively enhance the signal of particular compounds in a mixture. As such, in some configurations, the fluid union 306 can comprise additional fluid ports (e.g., third fluid port, fourth fluid port, and so on) to receive additional fluid streams (e.g., a second fluid, third fluid, and so on) that mix in the fluid union 306 with the fluid sample received from the chromatographic column 302. In various embodiments, the additional fluid streams can each be sourced from separate reservoirs or from additional fluid columns such as additional chromatographic columns. In embodiments where additional fluid streams are received at additional fluid ports of the fluid union from additional chromatographic columns, the electrical conductor 314 can be extended to connect to additional fluid junctions upstream of the additional chromatographic columns. As such, an equipotential can be established between the fluid union 306, the fluid junction 304, and these additional fluid junctions. The additional fluid streams can include post-column additives in some embodiments. Post-column additives (PCAs) may be used to influence the electrospray ionization process in various ways, for example, to promote desolvation, change the charge state distribution, or other known ways, and they can be solvents or other chemical moieties.

In various embodiments taught herein, the fluidic paths 218, 220, 222, 224 are formed of flexible or rigid tubing. In some embodiments, the fluidic paths 218, 220, 222, 224 can include paths or capillaries formed at least in part of fused silica or plastic/polymeric materials. The fluidic paths 218, 220, 222, 224 can include capillaries having inner coatings such as polyether ether ketone (PEEK). In some embodiments, the fluidic path 218 can have an inner diameter in a range from 10 to 50 microns or in a range from 20 to 40 microns. The fluidic path 218 can have an inner diameter of 30 microns in some embodiments. The fluidic path 218 can have a length in a range from 10-50 cm or in a range from 20-40 cm. The fluidic path 218 can have a length of 35 cm in some embodiments. In some embodiments, the fluidic path 220 can have an inner diameter in a range from 10 to 50 microns or in a range from 20 to 40 microns. The fluidic path 220 can have an inner diameter of 30 microns in some embodiments. The fluidic path 220 can have a length in a range from 10-50 mm or in a range from 20-40 mm or in a range from 50-100 mm. The fluidic path 220 can have a length of 35 mm in some embodiments.

In some embodiments, the fluidic path 222 can have an inner diameter in a range from 5-50 microns. The fluidic path 222 can have an inner diameter of 5 microns, 10 microns, 20 microns, 25 microns, 30 microns, or 40 microns in some embodiments. The fluidic path 222 can have a length in a range from 10-50 mm or in a range from 20-40 mm or in a range from 50-100 mm. The fluidic path 222 can have a length of 35 mm in some embodiments. In some embodiments, the fluidic path 224 can have an inner diameter in a range from 5-50 microns. The fluidic path 224 can have an inner diameter of 5 microns, 10 microns, 20 microns, 25 microns, 30 microns, or 40 microns in some embodiments. The fluidic path 224 can have a length in a range from 10-50 mm or in a range from 20-40 mm or in a range from 50-100 mm. The fluidic path 224 can have a length of 35 mm in some embodiments. The fluidic path 224 can have a reduced inner and outer diameter as compared to other fluidic paths in the system to help reduce peak broadening. In one example, the fluidic path 224 has an inner diameter of 5 or 10 microns while the fluidic paths 218, 220 have an inner diameter of 30 microns.

In some embodiments, the cartridge (more specifically, a same chromatographic column and electrospray emitter) can be used for several hundred injections. However, a given chromatographic column tends to have a longer useful lifespan than a given electrospray emitter. Therefore, in some embodiments, the first fluid port 310, the second fluid port 312, or both the first and second fluid ports of the fluid union 306 are configured to enable disconnection and reconnection of fluidic paths or electrospray emitters attached thereto. In such embodiments, the electrospray emitter (or fluid union 306) can be removed from the cartridge 208 and replaced by a new electrospray emitter 308 or fluid union 306. This ability to exchange the emitter enables the full use of the column's lifetime. In some embodiments, the fluidic path 222 and fluidic path 224 are configured to be disconnected and reconnected to the first end 318 and the second end 320 of the chromatographic column 302, respectively.

By having removable fluidic paths, the chromatographic column 106 can be removed from the cartridge and replaced.

FIG. 3 depicts an electrospray system 300 with a chromatographic column 302 having a conductive or semiconductive stationary phase in accordance with some embodiments taught herein. The electrospray system 300 includes a chromatographic column 302 having a first end 318 and a second end 320, a post-column fluid union 306, a pre-column fluid junction 304, and an electrospray emitter 308. The post-column fluid union 306 and the pre-column fluid junction 304 are connected by an electrical conductor 314. The electrical connection of the fluid union 306 to the fluid junction 304 by the electrical conductor 314 creates a true equipotential between the first end 318 and the second end 320 of the chromatographic column 302.

In some embodiments, the electrospray system 300 can include a housing that shields and protects components within the housing. In some embodiments, the housing can be shaped as a cartridge that can be removably inserted into a larger system. The housing can include an inlet port 316 for fluid that is connected to the fluid junction 304. The housing can also include a high-voltage electrical connector 322 mounted thereon or passing therethrough. A voltage can be applied to the high-voltage electrical connector 322 using a power supply 202. A fluid sample is supplied to the inlet port 316 from a fluid source. The fluid sample passes through the inlet port 316 and a body of the fluid junction 304 along fluidic path 222 to the first end 318 of the chromatographic column 302. In the chromatographic column 302, analytes of the fluid sample are temporally separated within the fluid sample such that a separated fluid sample (i.e., a fluid sample including separated analytes) is output from the second end 320 of the chromatographic column 302. The separated fluid sample travels along a fluidic path 224 to a first fluid port 310 of the fluid union 306. The fluid sample is ionized by a high electrical potential ($V_+$) applied at the fluid union 306. The electrospray emitter 308 is connected to a second fluid port 312 of the fluid union 306. The ionized fluid stream is emitted from the electrospray emitter 308 as ionized droplets. For example, the electrospray emitter 308 can include a needle and the droplet can be ejected through a distal tip of the needle. In some embodiments, the electrospray emitter 308 has an inner diameter of less than about 30 micrometers to enable nanoESI. In some embodiments, the emitted ionized droplets leave the electrospray emitter 308 and travel towards an atmospheric pressure inlet to a mass spectrometer that serves as a counter electrode 112. The electrospray current return is commonly formed by the electrically grounded counter electrode 112 as shown in FIG. 3.

In the absence of a current sensing circuit, the electrospray system 300 can receive the high voltage $V_+$ from the power supply 202 and distribute the high voltage $V_+$ directly to the fluid junction 304 and the fluid union 306 via the electrical conductor. In other embodiments, a current sensing circuit similar to that described in relation to FIG. 2, FIG. 5, and/or FIG. 6 can be placed into the circuit between the power supply 202 and the high-voltage electrical connector 322. Note that the power supply 202 can be supplied with the electrospray system 300 in some embodiments as a combined system. In other embodiments, the electrospray system 300 is designed to interface with a power supply 202 that is provided separately.

Figure 4:
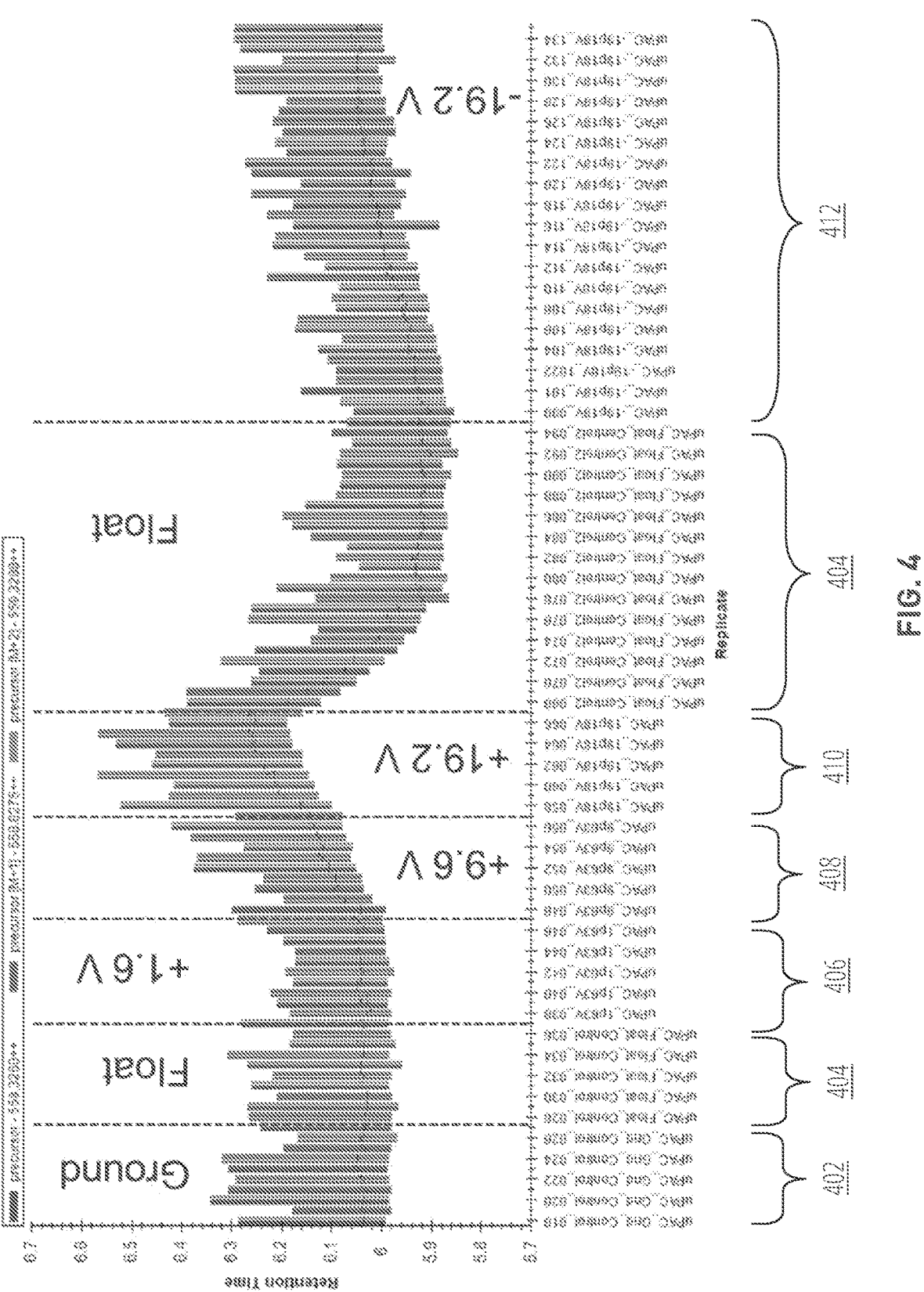
FIG. 4 shows a graph of retention time for a particular analyte in a chromatographic column with a semiconductive stationary phase according to some embodiments taught herein for a series of replicated experiments under different conditions.

FIG. 4 shows a graph of retention time for a particular analyte (specifically, a peptide with the amino acid sequence GLILVGGYGTR) in a chromatographic column 302 having a semiconductive stationary phase according to some embodiments taught herein for a series of replicated experiments under different conditions. These experiments demonstrate the effect on analyte retention time of charging due to non-equipotential voltage conditions on the chromatographic column having a conductive or semiconductive stationary phase. Note that voltage differences (or drops) of tens of volts across the chromatographic column can easily arise, e.g., in the electrospray system 100 of FIG. 1 because of the high voltages being applied to the emitter (e.g., up to 8 kV). For example, for a current sensing resistor with a resistance of 10 MΩ and an electrospray current of 5 µA, a 50 V difference arises across the current sensing circuit 116 and, hence, the chromatographic column 106 for the electrospray system 100 shown in FIG. 1.

Under a first condition 402, the chromatographic column is grounded (i.e., the chromatographic column is isolated from the high voltage applied to the electrospray emitter by a grounded fluid junction placed between the emitter and the column). Under the second condition 404, the chromatographic column 302 is floated at high voltage (i.e., voltage sufficient to induce electrospray ionization of a fluid sample) with equipotential conditions between the first end and the second end of the chromatographic column as taught in various embodiments taught herein. As described above, the systems taught herein can achieve a float of the chromatographic column without the use of a second fluid junction downstream of the chromatographic column, which induces peak dispersion. Across both the first condition 402 and the second condition 404, the average retention time is relative stable and does not evolve or change over replicated experiments.

Under the third condition 406, fourth condition 408, and fifth condition 410, voltage differences of +1.6 V, +9.6 V, and +19.2 V are intentionally induced between fluid junctions/unions (e.g., fluid junction 102 and fluid union 104 of the system of FIG. 1) located respectively at the first end 318 and the second end 320 of the chromatographic column 302 as would arise in a conventional system such as electrospray system 100. As seen in FIG. 4, the stability of the analyte retention time degrades significantly over repeated experiments due to charge accumulation in the semiconductive stationary phase of the chromatographic column. As a result, experimental results from early runs in an experimental series can no longer reliably be compared to experimental results from later runs in the experimental series.

After the application of the fifth condition 410 to the chromatographic column 302, the experimental condition was returned to the second condition 404 wherein the chromatographic column 302 is floated at high voltage with equal voltages applied to the first end 318 and the second end 320 (e.g., as occurs in electrospray system 300 wherein equal voltages are applied to fluid junction 304 and fluid union 306). It is seen that the retention time repeatability recovers over some early experimental runs to return to a stable retention time as further experimental runs are conducted. Finally, the chromatographic column 302 is subjected to a sixth condition 412 where an intentional voltage difference of −19.2 V is applied between the first end 318 and the second end 320 of the chromatographic column 302. Again, the retention time becomes unstable and changes from experiment to experiment as accumulated charge within the semiconductive chromatographic column 302 begins to impact analyte retention within the chromatographic column.

Table 1 below gives the measured coefficient of variation for each of the experimental conditions illustrated in FIG. 4. As shown by the values, the experimental variation is significantly reduced under conditions where the first end and the second end of the chromatographic column are at equal electrical potentials.

| Experimental Configuration | Retention Time % CV |
|---|---|
| first condition 402 | 0.10% |
| second condition 404 | 0.08% |
| third condition 406 | 0.13% |
| fourth condition 408 | 0.51% |
| fifth condition 410 | 0.54% |
| repeated second condition 404 (last 10 injections once stable) | 0.12% |
| sixth condition 412 | 0.25% |

Figure 5:
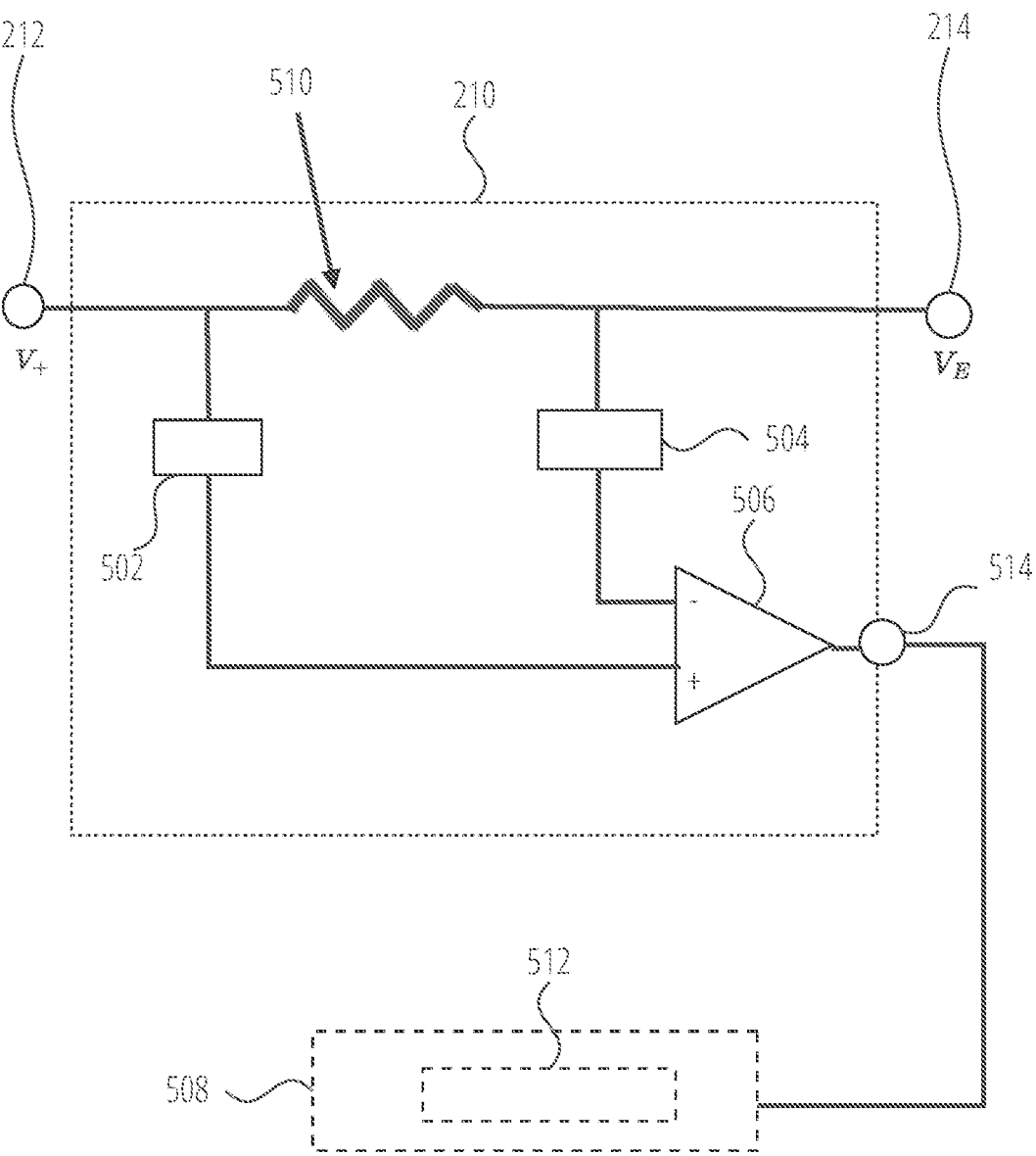
FIG. 5 schematically illustrates a current sensing circuit for use with embodiments of the systems, methods, and cartridges taught herein.

FIG. 5 illustrates an example current sensing circuit 210 for use with embodiments of the systems, methods, and cartridges taught herein. The current sensing circuit 210 can include a current sensing resistor 510 disposed between the high side 212 and the low side 214 of the current sensing circuit 210. In some embodiments, the current sensing circuit 210 consists only of the current sensing resistor 510, a first electrical lead connecting the high side 212 of the current sensing circuit 210 to a voltmeter, and a second electrical lead connecting the low side 214 of the current sensing circuit 210 to the voltmeter. In such an arrangement, the voltmeter can measure high voltages with high precision. To reduce the expense of the current sensing circuit 210, additional electronic elements such as those shown in FIG. 5 can be used to attenuate the voltage levels such that data acquisition electronics compatible with modern computing devices can be used.

In the embodiment shown in FIG. 5, the current sensing circuit 210 includes a current sensing resistor 510, a first voltage divider 502, a second voltage divider 504, and a difference amplifier 506. The voltage between the high side 212 and the low side 214 of the current sensing resistor 510 is heavily attenuated via the precision voltage dividers (502, 504) to comply with typical data acquisition and computer voltage potentials. In one embodiment, the precision voltage dividers 502, 504 operate at a 1,000:1 reduction ratio. The resulting voltages at the outputs of the voltage dividers 502, 504 can be subtracted using the difference amplifier 506. The difference obtained at an output 514 of the current sensing circuit 210 provides a direct proportional measure of the ESI spray current. In various embodiments, the resistance of the current sensing resistor 510 can be in a range from 10 kΩ to 10 GΩ, in a range from 1 MΩ to 1 GΩ, or in a range from 10 MΩ to 100 MΩ.

Optionally, a controller 508 can be coupled with the output 514 of the current sensing circuit 210. The controller 508 may be configured to receive the output current directly from output 514 or a digitized representation of the output 514. In some embodiments, the controller 508 determines a state of the electrospray emitter based on the measured electrical current flow. Specifically, the state of the electrospray emitter includes a mode of operation within a particular electrospray regime.

In some embodiments, the controller 508 includes a user interface 512 configured to display or otherwise alert a user or operator of the determined electrospray regime. In other embodiments, the controller 508 can interface with an external user interface. In some embodiments, the controller 508 can determine a health of the cartridge 208, for example, by tracking and identifying changes in the output current with respect to the applied voltage over time. If the changes are significant (e.g., past a threshold limit), the controller 508 can indicate to a user that the cartridge 208, or a portion of the cartridge 208 such as the chromatographic column 302 or the electrospray emitter 308, should be replaced.

In the current sensing circuit 210 of FIG. 5, the current measurement is obtained with high precision using relatively less expensive electronics without an isolation amplifier. One difficulty with direct high-side measurement techniques (i.e., measurement of electrospray current at the high voltage side of the circuit as opposed to low-side measurement of the return current from the counter electrode 112 to the power supply 202) is measuring current to nanoamp resolution in the presence of a very high common mode voltage (e.g., +/−8 kilovolts). Such a high common mode voltage is then heavily attenuated in order to protect the downstream electronics. Another solution to overcome these difficulties is by isolating, or electrically floating, the large common mode supply voltage and sense circuit to protect the downstream electronics. The measured quantity may be translated across the isolation barrier using modulation and demodulation techniques to the downstream electronics.

Figure 6:
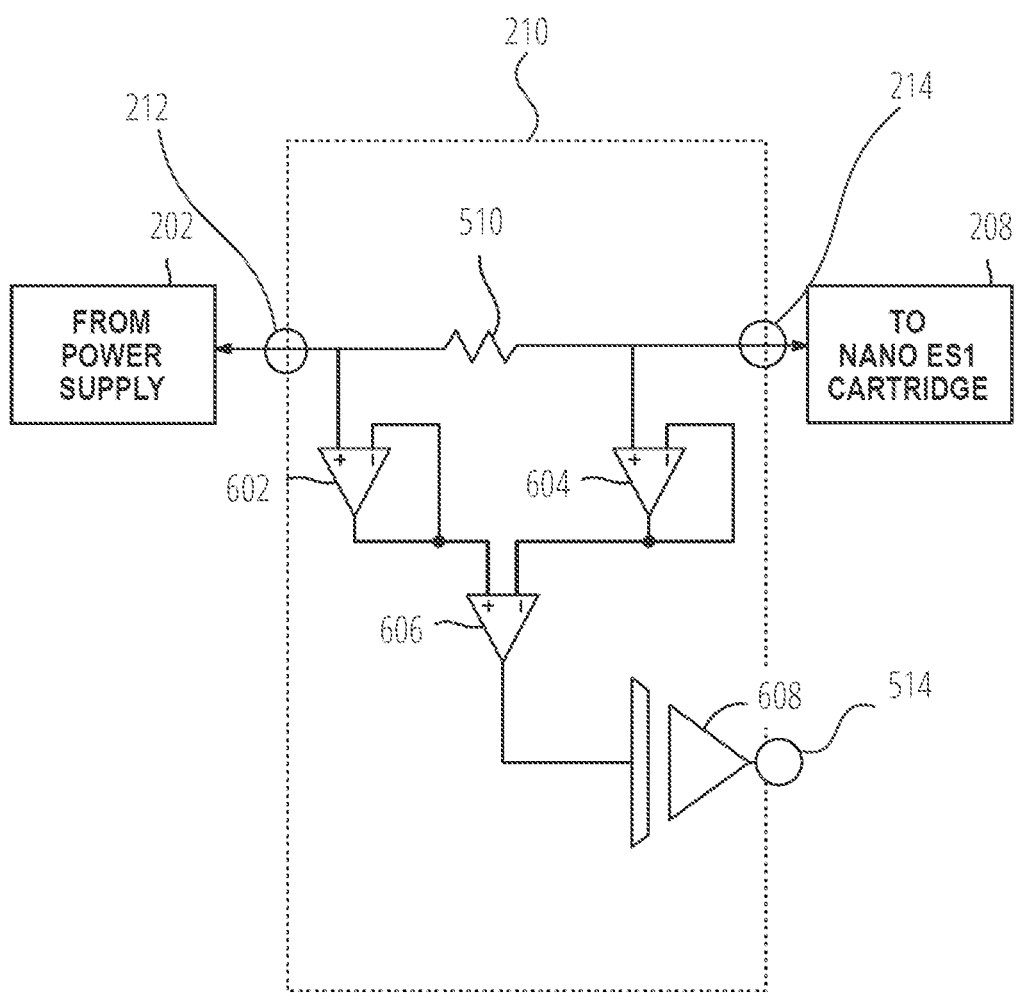
FIG. 6 schematically depicts a current sensing circuit including isolation that is suitable for use in some embodiments taught herein.

FIG. 6 schematically depicts an alternative current sensing circuit 210 as an isolation amplifier circuit that is suitable for use in some embodiments taught herein. The isolation amplifier circuit can electrically float the large input voltage. In this embodiment, the current sensing circuit 210 includes the current sensing resistor 510. The high side 212 and the low side 214 of the current sensing circuit 210 are electrically coupled with a first buffer 602 and a second buffer 604, respectively. The outputs from the first buffer 602 and the second buffer 604 are connected to a difference amplifier 606. The output of the difference amplifier 606 flows to an isolation amplifier 608. The output of the isolation amplifier 608 forms the output 514 of the current sensing circuit 210 that may, optionally, be connected to a controller 508 as described above with respect to FIG. 5. The current sensing circuit 210 described in FIG. 6 also benefits from use of an isolated power supply 202 for the floating amplifiers as well as a means of modulation and demodulation across the isolation barrier (not shown). The modulation and demodulation may introduce systematic noise.

Other embodiments of current sensing circuits and current monitoring circuits that are suitable for use with embodiments of systems, methods, and cartridges taught herein are described in U.S. Patent Application Publication No. 2023/0030920 by Lindseth et al., the entire contents of which is incorporated herein by reference.

FIG. 7 illustrates a routine 700 for reducing electrochromatographic effects in an electrospray system, in accordance with various embodiments taught herein. In block 702, routine 700 flows a fluid sample from a first pre-column fluid junction 304 to a first end 318 of a chromatographic column 302. The chromatographic column 302 includes a conductive or semi-conductive stationary phase disposed between the first end 318 and the second end 320 of the chromatographic column. In block 704, routine 700 separates analytes within the fluid sample using the chromatographic column 302. In block 706, routine 700 outputs the separated fluid sample from the second end of the chromatographic column to a first fluid port 310 of the post-column fluid union 306. The fluid union 306 has a second fluid port 312 connected to an electrospray emitter 308. In block 708, routine 700 applies an equipotential voltage in a range of +1 to +10 kilovolts or in a range of −1 to −10 kilovolts at both the first pre-column fluid junction 304 and at the post-column fluid union 306 using an electrical conductor 314 in electrical contact with the first pre-column fluid junction and the post-column fluid union. In optional block 710, the routine 700 applies a first voltage to the high side 212 of the current sensing circuit 210 using the power supply 202. In optional block 712, the routine 700 transmits the equipotential voltage from the low side 214 of the current sensing circuit 210 to the electrical conductor 314.

Many of the embodiments taught herein are in the context of a replaceable ESI cartridge (e.g., cartridge 208 in FIG. 2). However, the techniques taught herein can also be implemented in other systems that do not include the cartridge. In such embodiments without the cartridge, the system still advantageously provides speed and simplicity in replacing the electrospray emitter (e.g., by disconnecting the needle from the fluid union) without disturbing or otherwise dismantling the remaining fluid and electrical connections in the system.

Although the present systems, methods, and cartridges and associated advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments taught herein may be utilized according to the present disclosure. Accordingly, the appended claims are intended to include within their scope such processes, machines, manufacture, compositions of matter, means, methods, or steps.

The section headings used herein are for organizational purposes and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied (unless explicitly noted otherwise) and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments taught herein belongs.

It will be appreciated that there is an implied "about" prior to specific temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Advantages and features of the present disclosure can be further described by the following examples:

Example 1. An electrospray system, comprising: a first pre-column fluid junction to receive a fluid sample; a chromatographic column for separating analytes within the fluid sample, the chromatographic column including conductive or semi-conductive stationary phase disposed between a first end and a second end of the chromatographic column, the first end fluidically connected to the first pre-column fluid junction; a post-column fluid union having a first fluid port and a second fluid port, the first fluid port receiving separated analytes in the fluid sample from the second end of the chromatographic column; an electrospray emitter fluidically connected to the second fluid port; and an electrical conductor connected to the post-column fluid union and the first pre-column fluid junction to equalize electrical potential between the post-column fluid union and the first pre-column fluid junction.

Example 2. The electrospray system of example 1, further comprising a current sensing circuit having a high side and a low side, the low side of the current sensing circuit being electrically connected to the electrical conductor.

Example 3. The electrospray system of example 2, further comprising a power supply electrically connected to the high side of the current sensing circuit.

Example 4. The electrospray system of example 3, further comprising a second pre-column fluid junction to deliver the fluid sample to the first pre-column fluid junction, wherein the power supply is electrically connected to supply high voltage to the second pre-column fluid junction.

Example 5. The electrospray system of example 1, wherein the post-column fluid union and the first pre-column fluid junction are electrically connected in parallel with one another and in series with a current sensing circuit.

Example 6. The electrospray system of example 1, wherein a fluidic path connecting the second end of the chromatographic column and the post-column fluid union has an inner diameter of 30 micrometers or less to reduce peak broadening.

Example 7. The electrospray system of example 1, wherein the chromatographic column, the post-column fluid union, the electrospray emitter, the electrical conductor, and the first pre-column fluid junction are housed in a replaceable cartridge.

Example 8. The electrospray system of example 7, wherein the cartridge includes a high-voltage electrical connector that is electrically connected to the electrical conductor or to a current sensing circuit in series with the electrical conductor.

Example 9. The electrospray system of example 8, wherein the current sensing circuit is housed in the replaceable cartridge.

Example 10. The electrospray system of example 7, wherein the replaceable cartridge includes a housing that electrically shields the first pre-column fluid junction and the post-column fluid union.

Example 11. The electrospray system of example 1, wherein a length of a fluidic path between the first pre-column fluid junction and the chromatographic column and a length of a fluidic path between the chromatographic column and the post-column fluid union are each less than 100 mm.

Example 12. The electrospray system of example 1, further comprising a third pre-column fluid junction electrically connected to ground, the second pre-column fluid junction and the third pre-column fluid junction forming a pre-column voltage spacer.

Example 13. A method for reducing electro-chromatographic effects in an electrospray system, comprising: flowing a fluid sample from a first pre-column fluid junction to a first end of a chromatographic column, the chromatographic column including a conductive or semi-conductive stationary phase disposed between the first end and a second end of the chromatographic column; separating analytes within the fluid sample using the chromatographic column; outputting the separated fluid sample from the second end of the chromatographic column to a first fluid port of a post-column fluid union, the post-column fluid union having a second fluid port connected to an electrospray emitter; and applying an equipotential voltage in a range of +1 to +10 kilovolts or in a range of −1 to −10 kilovolts at both the first pre-column fluid junction and at the post-column fluid union using an electrical conductor in electrical contact with the first pre-column fluid junction and the post-column fluid union.

Example 14. The method of example 13, further comprising: applying a first voltage to a high side of a current sensing circuit using a power supply; and transmitting the equipotential voltage from a low side of the current sensing circuit to the electrical conductor.

Example 15. The method of example 14, wherein the post-column fluid union and the first pre-column fluid junction are electrically connected in parallel with one another and in series with the current sensing circuit.

Example 16. The method of example 13, wherein outputting the separated fluid sample from the second end of the chromatographic column to a first port of the post-column fluid union includes flowing the separated fluid sample through a fluidic path having an inner diameter of 30 micrometers or less to reduce peak broadening.

Example 17. The method of example 13, wherein flowing the fluid sample from the first pre-column fluid junction to the first end of the chromatographic column includes flowing the fluid sample through a fluidic path having a length of less than 100 mm.

Example 18. The method of example 13, wherein the chromatographic column, the post-column fluid union, the electrospray emitter, the electrical conductor, and the first pre-column fluid junction are housed in a replaceable cartridge, the method further comprising: connecting a second pre-column fluid junction of the cartridge to a source of the fluid sample; and flowing the fluid sample from the second pre-column fluid junction to the first pre-column fluid junction.

Example 19. The method of example 18, wherein the cartridge includes a high-voltage electrical connector in electrical connection with the electrical conductor, the method further comprising: electrically connecting a power supply to the high-voltage electrical connector.

Example 20. The method of example 14, wherein the first voltage is greater than the equipotential voltage.

Example 21. A cartridge for insertion into an electrospray system, the cartridge comprising: a first pre-column fluid junction to receive a fluid sample; a chromatographic column for separating analytes within the fluid sample, the chromatographic column including a conductive or semi-conductive stationary phase disposed between a first end and a second end of the chromatographic column, the first end fluidically connected to the first pre-column fluid junction; a post-column fluid union having a first fluid port and a second fluid port, the first fluid port receiving separated analytes in the fluid sample from the second end of the chromatographic column; an electrospray emitter fluidically connected to the second fluid port; and an electrical conductor connected to the post-column fluid union and the first pre-column fluid junction to equalize electrical potential between the post-column fluid union and the first pre-column fluid junction.

What is claimed is:

1. An electrospray system, comprising:
a first pre-column fluid junction to receive a fluid sample;
a chromatographic column for separating analytes within the fluid sample, the chromatographic column including a conductive or semi-conductive stationary phase disposed between a first end and a second end of the chromatographic column, the first end fluidically connected to the first pre-column fluid junction;
a post-column fluid union having a first fluid port and a second fluid port, the first fluid port receiving separated analytes in the fluid sample from the second end of the chromatographic column;
an electrospray emitter fluidically connected to the second fluid port; and
an electrical conductor connected to the post-column fluid union and the first pre-column fluid junction to equalize electrical potential between the post-column fluid union and the first pre-column fluid junction.

2. The electrospray system of claim 1, further comprising a current sensing circuit having a high side and a low side, the low side of the current sensing circuit being electrically connected to the electrical conductor.

3. The electrospray system of claim 2, further comprising a power supply electrically connected to the high side of the current sensing circuit.

4. The electrospray system of claim 3, further comprising a second pre-column fluid junction to deliver the fluid sample to the first pre-column fluid junction, wherein the power supply is electrically connected to supply high voltage to the second pre-column fluid junction.

5. The electrospray system of claim 1, wherein the post-column fluid union and the first pre-column fluid junction are electrically connected in parallel with one another and in series with a current sensing circuit.

6. The electrospray system of claim 1, wherein a fluidic path connecting the second end of the chromatographic column and the post-column fluid union has an inner diameter of 30 micrometers or less to reduce peak broadening.

7. The electrospray system of claim 1, wherein the chromatographic column, the post-column fluid union, the electrospray emitter, the electrical conductor, and the first pre-column fluid junction are housed in a replaceable cartridge.

8. The electrospray system of claim 7, wherein the cartridge includes a high-voltage electrical connector that is electrically connected to the electrical conductor or to a current sensing circuit in series with the electrical conductor.

9. The electrospray system of claim 8, wherein the current sensing circuit is housed in the replaceable cartridge.

10. The electrospray system of claim 7, wherein the replaceable cartridge includes a housing that electrically shields the first pre-column fluid junction and the post-column fluid union.

11. The electrospray system of claim 1, wherein a length of a fluidic path between the first pre-column fluid junction and the chromatographic column and a length of a fluidic path between the chromatographic column and the post-column fluid union are each less than 100 mm.

12. The electrospray system of claim 1, further comprising a third pre-column fluid junction electrically connected to ground, the second pre-column fluid junction and the third pre-column fluid junction forming a pre-column voltage spacer.

13. A method for reducing electro-chromatographic effects in an electrospray system, comprising:
flowing a fluid sample from a first pre-column fluid junction to a first end of a chromatographic column, the chromatographic column including a conductive or semi-conductive stationary phase disposed between the first end and a second end of the chromatographic column;
separating analytes within the fluid sample using the chromatographic column;
outputting the separated fluid sample from the second end of the chromatographic column to a first fluid port of a post-column fluid union, the post-column fluid union having a second fluid port connected to an electrospray emitter; and
applying an equipotential voltage in a range of +1 to +10 kilovolts or in a range of −1 to −10 kilovolts at both the first pre-column fluid junction and at the post-column fluid union using an electrical conductor in electrical contact with the first pre-column fluid junction and the post-column fluid union.

14. The method of claim 13, further comprising:
applying a first voltage to a high side of a current sensing circuit using a power supply; and
transmitting the equipotential voltage from a low side of the current sensing circuit to the electrical conductor.

15. The method of claim 14, wherein the post-column fluid union and the first pre-column fluid junction are electrically connected in parallel with one another and in series with the current sensing circuit.

16. The method of claim 13, wherein outputting the separated fluid sample from the second end of the chromatographic column to a first port of the post-column fluid union includes flowing the separated fluid sample through a fluidic path having an inner diameter of 30 micrometers or less to reduce peak broadening.

17. The method of claim 13, wherein flowing the fluid sample from the first pre-column fluid junction to the first end of the chromatographic column includes flowing the fluid sample through a fluidic path having a length of less than 100 mm.

18. The method of claim 13, wherein the chromatographic column, the post-column fluid union, the electrospray emitter, the electrical conductor, and the first pre-column fluid junction are housed in a replaceable cartridge, the method further comprising:

connecting a second pre-column fluid junction of the cartridge to a source of the fluid sample; and flowing the fluid sample from the second pre-column fluid junction to the first pre-column fluid junction.

19. The method of claim 18, wherein the cartridge includes a high-voltage electrical connector in electrical connection with the electrical conductor, the method further comprising:

electrically connecting a power supply to the high-voltage electrical connector.

20. The method of claim 14, wherein the first voltage is greater than the equipotential voltage.

\*　\*　\*　\*　\*